2,970,992
PROCESS FOR THE POLYMERIZATION OF ETHYLENE

Nikolaus Geiser and Helmut Kolling, Oberhausen-Holten, Germany, assignors to Ruhrchemie Aktiengesellschaft, Oberhausen-Holten, Germany No Drawing. Filed May 28, 1958, Ser. No. 738,280

Claims priority, application Germany June 13, 1957

1 Claim. (Cl. 260—94.9)

This invention relates to a new type of catalyst for the polymerization of olefins, particularly ethylene.

The polymerization of olefins at pressures below 100 kg./cm.$^2$ and at temperatures up to 100° C. is known. This process is effected with catalysts prepared from organo-metallic compounds, particularly organo-metallic compounds of aluminum, and compounds of metals of the 4th to 6th subgroups of the periodic table, particularly titanium compounds. The polymerization is generally effected in the presence of an auxiliary liquid in which the polymerization product is suspended. Hydrocarbon fractions of the benzine or diesel oil boiling range are generally used as auxiliary liquids.

It has now been found that the polymerization of olefins, especially the polymerization of ethylene, at pressures below 100 kg./cm.$^2$ and at temperatures up to 100° C. can be carried out with particular advantage if catalysts are used which are prepared from titanium compounds, organometallic compounds of aluminum and triphenyl chloromethane. The advantages of the specific effect of this catalyst become primarily obvious when polymerizing continuously over an extended period of time.

The exact mode of action of the triphenyl chloromethane added as the third catalyst component has not been completely ascertained to date. However, the surprising advantages of this new catalyst are obvious, as will be shown below.

According to a previous suggestion made in the assignee's co-pending application, Serial Number 675,802, continuous polymerization is effected with the use of catalysts prepared from one mol of titanium tetrachloride and at least 1.5 mols of aluminum alkyl compounds, and the molecular weight of the polymer thus obtained is controlled by introducing exactly proportioned amounts of oxygen. This mode of operation permits continuous polymerization to be carried out without the formation of films in the reactor, it being possible to maintain the molecular weight of the polymer at an absolutely constant level over several months. The addition of oxygen prevents an increase in the content of aluminum chloralkyl compounds in the polymerization vessel and consequently a variation of the molecular weight of the reaction product. In producing very low molecular weight polymers, e.g. of polyethylene having molecular weights below 100,000, the amount of oxygen is relatively large. Deterioration of the catalyst may occur if the supply of oxygen has not been proportioned quite exactly. Thus, difficulties are sometimes encountered in maintaining the yield of polymers, based on the amount of catalyst charged, at a level sufficient to obtain ash contents of the polymer produced within the low limits desired, e.g., below about 0.06% by weight, without additional process steps to remove inorganic matter.

These difficulties can be avoided by using the new catalysts. In contrast to the previous mode of operation, these catalysts do not require the addition of oxygen. Despite this fact, the molecular weight of the polymer produced will not vary even in continuous polymerization over extended periods of time. Moreover, the formation of films in the reactor is efficiently prevented. Since the addition of oxygen is no longer required, the new catalysts also permit the production of low molecular weight polymers having low ash content without the necessity of applying involved and costly de-ashing processes.

The preparation of the catalysts according to the present invention is simple. It may be carried out in various manners either by simultaneously adding together all of the three components diluted in conventional manner with the auxiliary liquid used in the polymerization and causing them to react by stirring or shaking, or by first allowing two of the components, i.e., the titanium tetrachloride and the triphenyl chloromethane, to react with each other and adding the third component later. It is also possible under certain conditions to add the third component directly to the reaction vessel after having charged the first two components. It may be advantageous, in certain instances, to subject the precipitate formed after reacting two of the components, e.g., after having mixed together titanium tetrachloride and triphenyl chloromethane, to a washing with the hydrocarbon auxiliary liquid used in the polymerization prior to adding the third component. The catalysts thus prepared are then added to the polymerization reactor in a conventional manner either batchwise or continuously.

Although, as mentioned above, the new catalysts are particularly advantageous in continuously operated polymerization, they may be used equally successfully in batch polymerization. In this type of operation, the advantage to be particularly emphasized is the fact that low molecular weight polymers can be produced without the formation of films in the reactor.

The present invention will now be further described by the following example, but it should be understood that this is given merely by way of explanation, not of limitation, and that many changes may be made in the details without departing from the spirit of the present invention.

Example

Ethylene is polymerized in a glass vessel of approximately 5 liters capacity equipped with an agitator, gas inlet and outlet, a thermometer well, a nozzle for introducing the catalyst, and an outlet through which part of the reaction mixture can be withdrawn from time to time. The reaction vessel is filled with 3 liters of an auxiliary liquid consisting of a $C_8$ to $C_{10}$ fraction from the hydrogenation of carbon monoxide and purified by hydrogenation over a nickel catalyst at 250° C. and subsequent thorough drying over pulverized calcium chloride. The auxiliary liquid had a water content of 5 p.p.m. The highly purified gas used for the polymerization had a content of ethylene of 97%. Total impurities such as acetylene, carbon monoxide, carbon dioxide, sulfur compounds, oxygen and water were 15 p.p.m.

The catalyst used had been prepared as follows: 600 ml. of hydrocarbon auxiliary liquid were placed into a vessel provided with a stirrer and previously freed from air and moisture by means of nitrogen gas. Then 9.5 grams of titanium tetrachloride and 13.2 grams of triphenyl chloromethane were added in succession under constant agitation. After a total stirring period of 2 hours and a subsequent settling period of 4 hours, the yellow precipitate which had formed was subjected to 5 washings, each with 400 ml. of the same auxiliary liquid previously cooled to 0° C. The catalyst solution was cooled with ice water during the stirring and settling period. The washed precipitate was then brought to a volume of 600 ml. with hydrocarbon auxiliary liquid and maintained in very fine dispersion by constant agitation. A second solution was prepared by adding 2.72 grams of diethyl aluminum monochloride to 200 ml. of hydrocarbon auxiliary liquid contained in a second vessel previously purged with nitrogen gas. Prior to being charged to the polymerization vessel, 10 ml. of the catalyst suspension described above and 10 ml. of the diethyl aluminum monochloride solution were stirred for 4 hours at room temperature in a vessel equipped with agitator in a nitrogen atmosphere. A portion of 20 ml. of the catalyst thus prepared was introduced into the polymerization vessel every 4 hours.

The polymerization is carried out at a temperature of approximately 70° C. Average ethylene absorption is about 40 liters per hour over the total reaction period. The reaction product withdrawn from the reaction vessel approximately every four hours is filtered and the resultant filtrate is returned into the reaction vessel. The filtration residue is freed from solvent and part of the catalyst residues by a treatment with steam and dilute sodium hydroxide solution. After drying, a white powder having an ash content of less than 0.04% by weight is obtained. The molecular weight, determined viscosimetrically, varies between 60,000 and 100,000 over a period of about two months. Formation of films in the reactor has not been observed.

What we claim is:

The process of producing polyethylene by polymerization of ethylene at pressures below 100 kg./cm.$^2$ and at temperatures up to 100° C. in the presence of catalysts, said catalysts consisting of the product formed by reacting diethyl aluminum monochloride with the reaction product of titanium tetrachloride and triphenyl chloromethane, the weight ratio of the components being respectively 2.72:3.2:4.4.

References Cited in the file of this patent

UNITED STATES PATENTS

| | | |
|---|---|---|
| 2,827,447 | Nowlin et al. | Mar. 18, 1958 |
| 2,833,755 | Coover | May 6, 1958 |

FOREIGN PATENTS

| | | |
|---|---|---|
| 1,153,323 | France | Sept. 30, 1957 |